United States Patent
Yatake et al.

(10) Patent No.: US 6,890,378 B2
(45) Date of Patent: May 10, 2005

(54) INKJET INK

(75) Inventors: Masahiro Yatake, Nagano (JP); Masayuki Momose, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 12 days.

(21) Appl. No.: 10/347,165

(22) Filed: Jan. 17, 2003

(65) Prior Publication Data

US 2003/0196569 A1 Oct. 23, 2003

(30) Foreign Application Priority Data

Jan. 18, 2002 (JP) ........................................ 2002-010698
Feb. 26, 2002 (JP) ........................................ 2002-050461

(51) Int. Cl.$^7$ ........................... C09D 11/02; G01D 11/00
(52) U.S. Cl. ................. 106/31.59; 106/31.89; 106/31.86; 106/31.58; 347/100
(58) Field of Search .......................... 106/31.58, 31.86, 106/31.59, 31.89; 347/100

(56) References Cited

U.S. PATENT DOCUMENTS

| | | | |
|---|---|---|---|
| 2,083,372 A | | 6/1937 | Guthmann |
| 3,291,580 A | | 12/1966 | Mallck |
| 5,156,675 A | | 10/1992 | Breton et al. |
| 5,183,502 A | | 2/1993 | Meichsner et al. |
| 5,196,056 A | | 3/1993 | Prasad |
| 5,879,439 A | * | 3/1999 | Nagai et al. ............... 106/31.28 |
| 5,985,014 A | * | 11/1999 | Ueda et al. ............... 106/31.58 |
| 5,993,524 A | * | 11/1999 | Nagai et al. ............... 106/31.27 |
| 6,051,057 A | * | 4/2000 | Yatake et al. ............. 106/31.58 |
| 6,454,846 B2 | * | 9/2002 | Yatake ..................... 106/31.58 |
| 6,554,891 B1 | * | 4/2003 | Momose et al. .......... 106/31.86 |
| 2003/0078320 A1 | * | 4/2003 | Yatake ........................ 523/160 |
| 2003/0106462 A1 | * | 6/2003 | Yatake et al. ............. 106/31.59 |

FOREIGN PATENT DOCUMENTS

| | | |
|---|---|---|
| JP | 56-049771 A | 5/1981 |
| JP | 56-095961 A | 8/1981 |
| JP | 56-147861 A | 11/1981 |
| JP | 01-015542 A | 1/1989 |
| JP | 02-002907 A | 1/1990 |
| JP | 02-003837 A | 1/1990 |
| JP | 07-094634 A | 4/1995 |
| JP | 08-059715 A | 3/1996 |
| JP | 08-283596 A | 10/1996 |
| JP | 10-110110 A | 4/1998 |
| JP | 10-110111 A | 4/1998 |
| JP | 10110114 A | 4/1998 |
| JP | 10-316909 A | 12/1998 |
| JP | 2001-139849 A | 5/2001 |

* cited by examiner

Primary Examiner—Mark L. Bell
Assistant Examiner—Veronica F. Faison
(74) Attorney, Agent, or Firm—Ladas & Parry LLP

(57) ABSTRACT

For the purpose of providing an ink for inkjet recording that allows substantially bleed-free printing to be performed on plain paper, and particularly recycled paper, and providing an inkjet ink capable of ensuring high print quality and maintaining high ejection stability on plain paper, recycled paper, and coated paper, the present invention provides an inkjet ink comprising, together with a coloring material and water, a nonionic substance that has acetylene bonds in the molecules thereof and that also has hydroxyl groups and/or alkylene oxide repeating structures (preferably a substance whose structure is shown by formula (IA) according to claim 2, a substance whose structure is shown by formula (I) according to claim 20, or the like), and a nonionic substance that has lipophilic units comprising alkyl groups or cycloalkyl groups and that also has alkylene oxide repeating structures (preferably a substance whose structure is shown by formula (IIA) according to claim 2, a substance whose structure is shown by formula (II) according to claim 20, or the like).

31 Claims, No Drawings

INKJET INK

BACKGROUND OF THE INVENTION

1. Field of the Invention

The present invention relates to an inkjet ink capable of providing high print quality on plain paper, recycled paper, or coated paper. The present invention relates to an inkjet ink capable of ensuring high ejection stability and providing high print quality on plain paper, recycled paper, or coated paper.

2. Description of the Related Art

Inkjet recording is a method in which ink is ejected as droplets from minute nozzles to record characters and patterns on the surface of a recording medium. The inkjet recording systems used include methods in which electric signals are converted to mechanical signals with the aid of an electrostrictive element, and ink stored in a nozzle head portion is continuously ejected to record characters or symbols on the surface of a recording medium; and methods in which ink stored in a nozzle head portion is foamed by the rapid heating of the part that is the closest to the ejection portion, discontinuously ejected by foaming-induced volumetric expansion, and used to record characters or symbols on the surface of a recording medium.

The ink used for such inkjet recording must ensure good print drying, no print bleeding, uniform printing on the surface of the recording medium, no blending of colors in the case of multicolor printing, and other characteristics. A particular problem in this case is that bleeding can be easily caused by fibers that have different permeability levels when paper is used as the recording medium.

In conventional inks for inkjet recording, glycol ether is often used as a wetting agent, as in Japanese Patent Publication No. H2-2907; or as a water-soluble organic solvent, as in Japanese Patent Publication No. H1-15542; or as a dyeing and dissolution accelerator, as in Japanese Patent Publication No. H2-3837.

To improve permeability, studies have been conducted into adding diethylene glycol monobutyl ether, as in U.S. Pat. No. 5,156,675; or adding Surfynol 465 (manufactured by Nisshin Chemical), a surfactant based on acetylene glycol, as in U.S. Pat. No. 5,183,502; or adding both the diethylene glycol monobutyl ether and Surfynol 465, as in U.S. Pat. No. 5,196,056. Diethylene glycol mono-n-butyl ether, which is called butyl carbitol, is described, for example, in U.S. Pat. No. 3,291,580. Alternatively, using diethylene glycol ethers for the ink, and other issues are studied in U.S. Pat. No. 2,083,372.

In cases in which pigments are used, many studies have been conducted and practical implementations introduced with the primary goal of reducing permeability and making the paper surface less wettable by ink to ensure adequate print quality. Alternatively, combinations of glycol ether and a pigment include examples in which triethylene glycol monomethyl ether is used for the pigment, as in Japanese Patent Application Laid-open No. S56-147861.

The prior art is disadvantageous, however, in that the ink permeability of paper is often insufficient and that the methods for reducing the wetting of the paper surface still allow the ink to spread on plain paper, and the widely used recycled paper in particular, and require some time for the printed matter to dry, for which reason the ink on the printed paper is slow to dry and cannot be quickly overlaid when continuous printing is performed. In addition, recycled paper is obtained by mixing components of various types of paper and is an aggregate of materials that have different permeability rates, with bleeding caused by the differences between these permeability rates. Systems and the like for heating the paper are commonly contemplated in order to reduce such bleeding. Heating paper or another print object during printing is disadvantageous, however, in that time is required to bring the heating unit in the device to a specific temperature, the device main body consumes more power, and the paper or other print object may be damaged.

Inks in which pigments are used are also disadvantageous in that when printing is performed on paper or other material having an ordinary sizing agent as the recording medium, the pigment remains on the surface of the paper or the like, and scratch resistance is impaired unless the ink is endowed with a measure of permeability. However, keeping permeability at an intermediate level limits the number of paper types on which uniform printing can be performed, and tends to reduce the quality of printed images.

In addition, methyl ethers such as those employed in Japanese Patent Application Laid-open No. S56-147861 are often used as glycol ethers for controlling permeability in inks obtained using pigments. Furthermore, nothing is as yet known about pigment-based inks for inkjet recording in which permeability can be improved with butyl ethers and printing can be accomplished with reduced spreading on a large number of paper types.

Among the characteristics required of the ink compositions used in inkjet printers or the like, the most important are (1) providing high-quality printed matter, (2) ensuring rapid drying on recording media, and (3) increasing reliability during recording.

The following items are taken into account in a comprehensive manner in relation to the requirement (1) that high-quality printed matter be provided: optical density of the printed matter, sharpness of green, degree of bleeding between different adjacent colors in the case of multicolor printing, and the like. Interaction between the ink composition and the recording medium is a factor that greatly affects these items. In the particular case of plain paper, which is used on a large scale in offices and the like, these characteristics vary greatly with the production method, and the quality of printed matter sometimes decreases considerably for certain combinations of ink compositions and plain-paper recording media. This tendency is even more pronounced for recycled paper, whose frequency of use has been increasing in recent years. Specifically, there is a need for an ink composition that can produce the same high-quality printed matter even when printing is performed on a variety of types of plain paper, recycled paper, and the like.

The requirement (2) that rapid drying be ensured on the recording medium stems from the fact that no soiling should occur even when printed portions come into contact with each other immediately after recording, that no soiling or the like be caused by the movement of coloring materials between recording media even when recording is performed continuously and the printed matter is stacked, and the like. Among these, the first characteristic is important in the sense of having a direct effect on improving the recording rate. Rapid drying has an effect on phenomena such as the evaporation, penetration, and solidification of ink compositions on recording media, and conventional methods are also based on utilizing these phenomena. For example, a method in which the addition of a surfactant is limited to a value no greater than the critical micelle concentration thereof is proposed in Japanese Patent Application Laid-open No.

S56-049771, a method for using a dialkylsulfosuccinate as a surfactant having a specific effect is proposed in Japanese Patent Application Laid-open No. 556-095961, and a method for using a surfactant that has an acetylene glycol backbone is proposed in U.S. Pat. No. 5,183,502. These methods are aimed at ensuring rapid drying by allowing the ink composition to rapidly penetrate the recording medium.

The items taken into account in a comprehensive manner in relation to the requirement (3) that high reliability be maintained during recording include not only the requirement that stable recording needs to be performed under regular service conditions, but also the requirements that the non-recording time (sometimes also referred to as "the decap time" or the like) from the moment the cap is removed until the moment a next recording is made needs to be extended; that stable recording without any plugging of the tips of ink-ejecting nozzles or the like needs to be performed even after the recording device has been allowed to stand in a hot, humid environment; and the like. These characteristics are greatly affected by the choice and compatibility of materials constituting the ink composition. Specifically, organic solvents with a low vapor pressure are conventionally used as constituent materials in order to minimize variations in ink compositions due to the evaporation of the materials in the compositions from the tips of ink-ejecting nozzles. Phase separation, deposition of insolubles, and other problems may also be reduced by taking into account the compatibility of the constituent materials.

The three major requirements described above are often in conflict with each other. For example, it is sometimes the case that the decap time decreases, plugging is apt to occur, and other problems are encountered when fast drying is emphasized and a material with a high evaporation rate is added to the ink composition as a constituent substance. It is also sometimes the case that the viscosity of an ink composition increases to render regular ejection unstable or that the quality of printed matter is reduced by some of the organic solvents used when plugging properties are emphasized and an organic solvent with a low evaporation rate or the like is added in a large amount.

In view of this, the present invention, which addresses such problems, is aimed at providing an inkjet ink that has exceptionally rapid penetration and allows printing characterized by minimal spreading to be performed, even without a particular provision of heating means, on plain paper, and particularly on recycled paper whose use has been growing in recent years.

Another object of the present invention is to provide an inkjet ink of high recording reliability that produces high-quality printed matter even when used to record information on various types of plain paper or recycled paper; has fast drying properties to prevent soiling from being caused by contact with fingers, other recording media, or the like even immediately after recording; and is less likely to create plugging or other defects.

SUMMARY OF THE INVENTION

The inkjet ink of the present invention comprises, together with a coloring material and water, a nonionic substance that has acetylene bonds in the molecules thereof and that also has hydroxyl groups and/or alkylene oxide repeating structures, and a nonionic substance that has lipophilic units comprising alkyl groups or cycloalkyl groups and that also has alkylene oxide repeating structures.

The inkjet ink of the present invention has, as an embodiment thereof, a water-base ink for inkjet recording that comprises a coloring material, a water-soluble organic solvent, and water, and that further comprises a substance whose structure is shown by formula (IA) below, and a substance whose structure is shown by formula (IIA) below. (This invention will be referred to hereinbelow as "the invention of the first embodiment.")

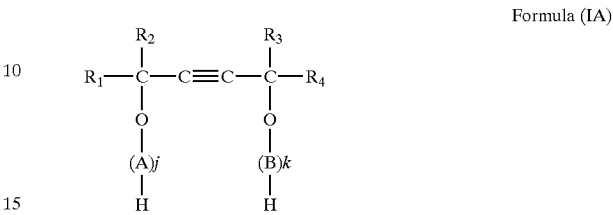

Formula (IA)

(where $R_1$, $R_2$, $R_3$, and $R_4$ are each independently a methyl, ethyl, propyl, or butyl group; A and B are each independently an ethylene oxide group, a propylene oxide group, or an ethylene oxide group and a propylene oxide group; and j+k (average value)$\leq$50).

Formula (IIA)

(where $R_5$ is an alkyl or cycloalkyl group with a carbon number of 4 to 20; PO is a propylene oxide group; EO is an ethylene oxide group; n and m are repeating units in a molecule; $0.5 \leq n \leq 5$; $3 \leq m \leq 30$; and EO and PO can have any sequence).

The inkjet ink of the present invention, as another embodiment thereof, is an inkjet ink comprising at least a coloring material and water, and further comprising a substance whose structure is shown by formula (I) below, and a substance whose structure is shown by formula (II) below. (This invention will be referred to hereinbelow as "the invention of the second embodiment.")

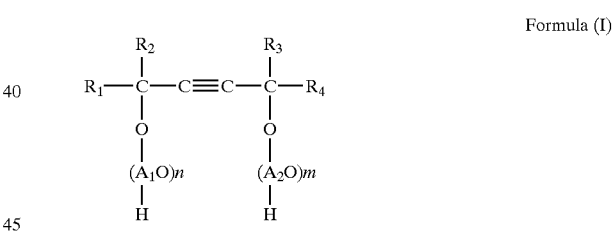

Formula (I)

(where $R_1$, $R_2$, $R_3$, and $R_4$ are each independently an alkyl chain that has a carbon number of 0 to 6 and may have a branched structure; $A_1O$ and $A_2O$ are each independently a copolymer structure of an ethylene oxide group, a propylene oxide group, or an ethylene oxide group and a propylene oxide group; the subscripts n and m indicate the repeating $A_1O$ and $A_2O$ units; $0 \leq n < 30$, $0 \leq m < 30$, and $0 \leq n+m < 50$).

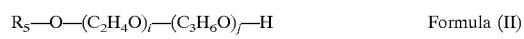

Formula (II)

(where $R_5$ is an alkyl or cycloalkyl group with a carbon number of 4 to 20, and the subscripts i and j indicate the repeating $C_2H_4O$ units and $C_3H_6O$ units, respectively).

The inkjet recording method of the present invention comprises ejecting droplets of any of the above-described inkjet inks and depositing these droplets on a recording medium.

The recorded matter of the present invention is obtained by performing recording in accordance with the inkjet recording method of the present invention.

The inkjet recording apparatus of the present invention is loaded with any of the above-described inkjet inks.

DESCRIPTION OF THE PREFERRED EMBODIMENTS (Ink of the Invention of the First Embodiment)

The present invention is the result of extensive research conducted in view of the fact that an ink for inkjet recording must ensure that the print dries easily and does not bleed, that uniform printing can be achieved on any recording medium surface, and that other characteristics can be provided.

Because adding less than 0.1 wt % of the formula (IA) substance used in the present invention does not appear to be effective for improving print quality, it is necessary to add 0.1 wt % or greater. Furthermore, the addition must be 10 wt % or less because viscosity increases if more than 10 wt % is added, making it impossible to perform stable printing.

In addition, the surfactant used must be soluble in water and preferably have high H.L.B. because a water-soluble inkjet ink is used in the present invention. The compound of formula (IIA) preferably has an H.L.B. of 7 or greater.

The $R_1$, $R_2$, $R_3$, and $R_4$ shown in formula (IA) are each independently a group selected from methyl, ethyl, propyl, and butyl groups, and the propyl and butyl groups comprise corresponding structural isomers, but because water solubility varies with the type of isomer or the structure of $R_1$, $R_2$, $R_3$, and $R_4$, a region in which there is no clouding point and in which excellent print quality can be ensured must be selected in an appropriate manner by appropriately selecting and combining the substance whose structure is shown by formula (IIA).

In addition, the j and k in formula (IA) above total at least 50 or less. A value of 50 or less should be adopted because the molecular weight increases and the capacity of the material to function as a surfactant decreases if the value exceeds 50, although it cannot be said that the material is impossible to use if the value is greater than 50.

The $R_5$ of the substance whose structure is shown by formula (IIA) above is preferably an alkyl or cycloalkyl group with a carbon number of 4 to 20, n is 0.5 to 5, and m is 3 to 30. The effect of the formula (IA) substance decreases if $R_5$ has a carbon number of less than 4 or greater than 20. The number is preferably 6 to 18, and more preferably 8 to 16. If the number is less than 0.5, pronounced foaming occurs and the formula (IA) substance becomes less effective as a solubilizer. If the number exceeds 5, the molecular weight increases, a large amount must be added in order to make the formula (IA) substance more effective as a solubilizer, and dispersion stability tends to deteriorate, particularly when a pigment is used. If m is less than 3, solubility in water decreases, and the formula (IA) substance becomes less effective as a solubilizer, whereas if the number exceeds 30, a large amount must be added in order to make the formula (IA) substance more effective as a solubilizer.

A distinctive feature is that the substance whose structure is shown by formula (IIA) above is added in an amount of 0.1 to 10 times the amount of the substance whose structure is shown by formula (IA) above. At less than 0.1 time, the effect of the solubilizer is low, and adding 10 or more times the amount causes the effect of the solubilizer to reach a ceiling. An amount of 0.2 to 2 times is preferred.

The substance shown by formula (IA) above is preferably added to the ink in an amount of from 0.1 wt % or greater to 10 wt % or less. The improvement in print quality becomes ineffective at less than 0.1 wt %, and exceeding 10 wt % is undesirable because of increased viscosity and more vigorous foaming, making the product unsuitable for inkjet recording.

A distinctive feature is that the coloring material comprises one or more materials selected from water-soluble dyes, water-soluble pigments that are rendered dispersible in water by surface treatment, and water-soluble pigments that are rendered dispersible in water by means of a dispersion polymer. The present invention allows a large number of coloring materials to be used, including, in addition to water-soluble dyes, materials such as water-soluble pigments that are dispersed and rendered soluble in water by a surface treatment, and water-soluble pigments that are rendered dispersible in water by means of a dispersion polymer.

Furthermore, at least an alkylene glycol monoalkyl ether and/or 1,2-alkylene glycol is preferably added to the ink for inkjet recording.

The alkylene glycol monoalkyl ether is an alkylene glycol with no more than 10 repeating units, and preferably an alkyl ether with a carbon number of 4 to 10. Among alkylene glycols with no more than 10 repeating units, the alkyl ether with a carbon number of 4 to 10 is preferably a di(tri) ethylene glycol monobutyl ether and/or (di)propylene glycol monobutyl ether. In addition, the 1,2-alkylene glycol is preferably 1,2-hexanediol and/or 1,2-pentanediol.

The substance comprising one or more compounds selected from the aforementioned di(tri)ethylene glycol monobutyl ether, (di)propylene glycol monobutyl ether, and 1,2-alkylene glycols is preferably added in an amount of 0.5 wt % or greater and 30 wt % or less. At less than 0.5 wt %, the permeability effect is low and there is no increase in print quality. Exceeding 30 wt % makes the product more difficult to use due to increased viscosity and has no effect on improving the print quality even when a greater amount is added. An amount of from 1 wt % or greater to 15 wt % or less is even more preferred.

The content of the substance shown by formula (IA) above is preferably from 0.1 wt % or greater to 5 wt % or less. Exceeding 5 wt % causes the effect of print quality to reach a ceiling, brings about increased viscosity to make the product more difficult to use even when the addition is made, tends to allow the ink to deposit on the tip of the head, and is more apt to disrupt the printing process. The improvement in print quality becomes ineffective at less than 0.1 wt %. A more preferred addition ranges from 0.15 to 2 wt %.

It is preferable to concurrently add at least the substance shown by formula (IA) above and one or more compounds selected from di(tri)ethylene glycol monobutyl ether, (di) propylene glycol monobutyl ether, and a 1,2-alkylene glycol. Such concurrent use of at least the substance shown by formula (IA) and one or more compounds selected from di(tri)ethylene glycol monobutyl ether, (di)propylene glycol monobutyl ether, and 1,2-alkylene glycols improves print quality.

The content of the substance shown by formula (IA) above is preferably 0.1 to 0.5 wt %, and the content of the one or more compounds selected from di(tri)ethylene glycol monobutyl ether, (di)propylene glycol monobutyl ether, and 1,2-alkylene glycols is preferably 1 wt % or greater. The substance shown by formula (IA) has the effect of improving permeability when used in a small amount. Consequently, print quality is further increased by keeping this amount at 0.5 wt % or less and by keeping the amount of the one or more compounds selected from di(tri)ethylene glycol monobutyl ether, (di)propylene glycol monobutyl ether, and 1,2-alkylene glycols at 1 wt % or greater.

In addition, the coloring agent obtained by dispersing a pigment with the aid of a dispersion polymer preferably has as the principal components thereof one or more compounds selected from the group consisting of polyacrylic esters, styrene/acrylic acid copolymers, polystyrene, polyester, polyamide, polyimide, silicon-containing polymers, and sulfur-containing polymers. The substance shown by formula (IA) and the one or more substances selected from di(tri)ethylene glycol monobutyl ether, (di)propylene glycol monobutyl ether, and 1,2-alkylene glycols, which are the materials used in the present invention, enter into sorption/desorption reactions with the dispersants used in regular dispersion processes involving dispersants, and hence tend to create a phenomenon in which the desorbed dispersant floats in the ink, and the printing process is disrupted by this floating. However, using the aforementioned polymer is preferred because forming an adequate dispersion allows the polymer to envelop the coloring agent in a stable manner, making it more difficult for sorption/desorption to occur.

Furthermore, the coloring agent obtained by dispersing a pigment with the aid of a dispersion polymer is preferably a product in which the pigment is enveloped in a copolymer of a copolymerizable monomer and a dispersant that has at least polymerizable groups. As used herein, the term "dispersant having polymerizable groups" refers to a compound having at least lipophilic groups, hydrophilic groups, and polymerizable groups; the term "polymerizable groups" refers to acryloyl, methacryloyl, allyl, vinyl, or other groups; and the term "copolymerizable groups" similarly refers to acryloyl, methacryloyl, allyl, vinyl, and other groups. The coloring agent obtained by enveloping a pigment in a polymer is preferably produced by emulsion polymerization because using a product with comparatively uniform grain sizes as the ink for inkjet recording is preferred from the standpoint of plugging or ejection stability. A strong polymer is obtained because the polymer has at least one compound selected from a group that comprises polyacrylic esters, styrene/acrylic acid copolymers, polystyrene, polyester, polyamide, polyimide, silicon-containing polymers, and sulfur-containing polymers as the principal components thereof. The polymer is not deformed even by the addition of the formula (IA) substance and the one or more compounds selected from glycol ethers and 1,2-alkylene glycols, which are the compounds acceptable for use in the present invention; and uniform grain sizes become easier to obtain.

The coloring agent obtained by enveloping a pigment in a polymer is obtained by dispersing the pigment with a dispersant that has polymerizable groups and performing emulsion polymerization in water using this dispersant together with a copolymerizable monomer and a polymerization initiator.

In preferred practice, the aforementioned 1,2-alkylene glycol is a 1,2-alkylene glycol with a carbon number of 4 to 10, and the amount added is 15 wt % or less. If the amount added exceeds 10 wt %, the product becomes more difficult to use in inkjet applications due to increased viscosity, and adding an even greater amount has no effect on improving print quality.

The aforementioned 1,2-alkylene glycol is preferably 1,2-pentanediol and/or 1,2-hexanediol. 1,2-Pentanediol is preferably 3 to 15 wt %. Adding less than 3 wt % has little effect in terms of improved permeability, and bleeding is widespread because of this. Adding more than 15 wt % results in low water solubility, so the product is more difficult to use for a water-soluble ink such as the one provided by the present invention. 1,2-Hexanediol is preferably 0.5 to 10 wt %. Adding less than 0.5 wt % has little effect in terms of improved permeability, whereas adding more than 10 wt % results in low water solubility, so the product is more difficult to use for a water-soluble ink such as the one provided by the present invention. When the substance shown by formula (IA) above is added in an amount of 0.5 wt % or greater, the ratio thereof in relation to 1,2-alkylene glycol (when referred to merely as "ratio" hereinbelow, the term indicates the weight ratio of the amounts added) is preferably from 1:0 to 1:10 from the standpoint of print quality, and when the substance shown by formula (IA) exceeds 10 times the amount, the effect of improved print quality reaches a ceiling, and adding an even greater amount has little effect and rather has the drawback of increased viscosity.

In preferred practice, the substance shown by formula (IA) above is added in an amount of 0.5 wt % or greater, and the ratio of the amount added in relation to the aforementioned 1,2-alkylene glycol is 1:0 to 1:10. The product preferably comprises no more than 10 wt % of the aforementioned (di)propylene glycol monobutyl ether. Exceeding 10 wt % causes the effect of improved print quality to reach a ceiling and rather has the drawback of increased viscosity, and results in reduced water solubility, making it necessary to add a solubilizer. 0.5 to 5 wt % is more preferable.

The ratio of the substance shown by formula (IA) above and the (di)propylene glycol monobutyl ether is preferably 1:0 to 1:10. When the amount of (di)propylene glycol monobutyl ether is more than 10 times the amount of the substance shown by formula (IA), the effect of improved print quality reaches a ceiling, and adding an even greater amount has little effect and rather has the drawback of increased viscosity.

The product preferably comprises no more than 20 wt % of the aforementioned di(tri)ethylene glycol monobutyl ether. Exceeding 20 wt % makes the product more difficult to use due to increased viscosity and has no effect on improving the print quality even when a greater amount is added. An amount of from 1 wt % or greater to 15 wt % or less is even more preferred. "Di(tri)ethylene glycol monobutyl ether" refers to diethylene glycol monobutyl ether (DEGmBE) and/or triethylene glycol monobutyl ether (TEGmBE), which are preferably added in an amount of 20 wt % or less as the permeability level necessary for ensuring improved print quality. Exceeding 20 wt % causes the effect or improved print quality to reach a ceiling and rather has the drawback of increased viscosity. 0.5 to 10 wt % is more preferable.

In preferred practice, the substance shown by formula (IA) above is added in an amount of 0.5 wt % or greater, and the ratio in relation to the aforementioned di(tri)ethylene glycol monobutyl ether is 1:0 to 1:10. Adding up to 10 times the amount of the substance shown by formula (IA) is preferred from the standpoint of print quality. The di(tri)ethylene glycol monobutyl ether serves to improve print quality and the solubility of the substance shown by formula (IA), but when the addition exceeds 10 times the amount, these effects reach a ceiling, making the product more difficult to use in inkjet applications.

Preservatives, antioxidants, electrical conductivity modifiers, pH modifiers, viscosity modifiers, surface tension modifiers, oxygen absorbents, nozzle plugging inhibitors, and other additives may also be used in an appropriate manner as components of the inkjet ink in the present invention.

Water-soluble glycols are preferably added in order to suppress the drying of ink on the front surfaces of nozzles. Examples include ethylene glycol, diethylene glycol, triethylene glycol, propylene glycol, dipropylene glycol, tripropylene glycol, polyethylene glycol with a molecular weight of 2000 or less, 1,3-propylene glycol, isopropylene glycol, isobutylene glycol, 1,4-butanediol, 1,3-butanediol, 1,5-pentanediol, 1,6-hexanediol, glycerol, meso-erythritol, and pentaerythritol.

Numerous types of saccharides may also be used in the present invention in order to suppress the drying and clogging of the ink on the front surfaces of nozzles. Monosaccharides and polysaccharides may be used, such as glucose, mannose, fructose, ribose, xylose, arabinose, lactose, galactose, aldonic acid, glucitose, maltose, cellobiose, sucrose, trehalose, maltotriose, alginic acid and salts thereof, cyclodextrins, and celluloses. The amount in which these are added should be from 0.05 wt % or greater to 30 wt % or less. At less than 0.05 wt %, there is little effect in recovering from a plugging phenomenon in which the ink dries and clogs the tip of the head, whereas exceeding 30 wt % causes the ink to become more viscous and makes it impossible to perform adequate printing. Monosaccharides and polysaccharides such as glucose, mannose, fructose, ribose, xylose, arabinose, lactose, galactose, aldonic acid, glucitose, maltose, cellobiose, sucrose, trehalose, and maltotriose, which are typical saccharides, are more preferably added in an amount of 3 to 20 wt %. The alginic acid and salts thereof, cyclodextrins, and celluloses must be added in an amount that does not excessively increase the viscosity of the resulting ink.

It is also possible to use glycol ethers, which are compatible with water but have low solubility in the water contained in the ink, and also to use the following compounds in order to improve the solubility of ink components, to improve penetrability into recording media such as paper, and to prevent nozzle plugging: ethanol, methanol, butanol, propanol, isopropanol, and other alkyl alcohols with a carbon number of 1 to 4; ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol monoisopropyl ether, and other glycol ethers; formamide; acetamide; dimethyl sulfoxide; sorbitol; sorbitan; acetin; diacetin; triacetin; and sulfolane. These can be appropriately selected and used, and the amount used is preferably 5 to 60 wt % in relation to the total amount of ink.

Other surfactants may also be added in order to further suppress the penetrability of the ink for inkjet recording in accordance with the present invention, or to improve the water solubility of the substance shown by formula (IA). The surfactants added are preferably those that have good compatibility with the ink systems described in the present embodiment. Along these surfactants, those that are stable and have high penetrability should be used. Examples thereof include amphoteric surfactants, nonionic surfactants, and the like. Examples of suitable amphoteric surfactants include lauryl dimethylaminoacetic acid betaine, 2-alkyl-N-carboxymethyl-N-hydroxyethylimidazolinium betaine, coconut oil fatty acid amide propyl dimethylaminoacetic acid betaine, polyoctyl polyaminoethyl glycine, and imidazoline derivatives. Examples of suitable nonionic surfactants include polyoxyethylene nonylphenyl ether, polyoxyethylene octylphenyl ether, polyoxyethylene dodecylphenyl ether, polyoxyethylene alkyl allyl ethers, polyoxyethylene oleyl ether, polyoxyethylene lauryl ether, polyoxyethylene alkyl ethers, polyoxyalkylene alkyl ethers, and other ethers; polyoxyethylene oleic acid, polyoxyethylene oleic acid esters, polyoxyethylene distearic acid esters, sorbitan laurate, sorbitan monostearate, sorbitan monooleate, sorbitan sesquioleate, polyoxyethylene monooleate, polyoxyethylene stearate, and other esters; and fluoroalkyl esters, perfluoroalkyl carboxylic acid salts, and other fluorine-based surfactants.

Sodium benzoate, pentachlorophenol sodium, 2-pyridine thiol-1-oxide sodium, sodium sorbate, sodium dehydroacetate, and 1,2-dibenzisothiazolin-3-one (Proxel CRL, Proxel BDN, Proxel GXL, Proxel XL-2, and Proxel TN, manufactured by ICI) may also be added as preservatives or fungicides, for example.

Alternatively, the following compounds may be added as pH modifiers, solubilizers, or antioxidants: diethanolamine, triethanolamine, propanolamine, morpholine, and other amines and modification products thereof; potassium hydroxide, sodium hydroxide, lithium hydroxide, and other inorganic acid salts; ammonium hydroxide; quaternary ammonium hydroxide (such as tetramethylammonium); potassium carbonate, sodium carbonate, lithium carbonate, and other carbonates; phosphates; N-methyl-2-pyrrolidone; urea, thiourea, tetramethylurea, and other ureas; allophanate, methyl allophanate, and other allophanates; biuret, dimethyl biuret, tetramethyl biuret, and other biurets; and L-ascorbic acid and salts thereof. Furthermore, commercially available antioxidants, ultraviolet absorbers, and the like may also be used. Examples thereof include Tinuvin 328, 900, 1130, 384, 292, 123, 144, 622, 770, and 292; Irgacor 252 and 153; Irganox 1010, 1076, and 1035; and MD 1024 from Ciba-Geigy, as well as lanthamide oxides.

In addition, rosins, alginic acids, polyvinyl alcohol, hydroxypropyl cellulose, carboxymethyl cellulose, hydroxyethyl cellulose, methyl cellulose, polyacrylates, polyvinyl pyrrolidone, and gum arabic starch can be cited as examples of suitable viscosity modifiers.

(Ink of the Invention of the Second Embodiment)

The inkjet ink of the present invention is an inkjet ink comprising at least a coloring material and water, and further comprising a substance whose structure is shown by formula (I) above, and a substance whose structure is shown by formula (II) above.

The substance expressed by formula (I) above is a surfactant that has acetylene bonds in the molecules thereof. Excellent penetrability into the recording medium, low foaming, and/or antifoaming properties are expected therefrom as an additive for the inkjet ink because of the compact molecular configuration and nonionic properties thereof. Depending on $R_1$ to $R_4$, the type of alkylene oxide, and the number of repeating units, the substance expressed by formula (I) above may be any of the compounds shown by formulas (III) to (IX) below, although it is apparent that this substance is not limited to the compounds shown herein, and any substance can be used without departing from the aspects of the present invention.

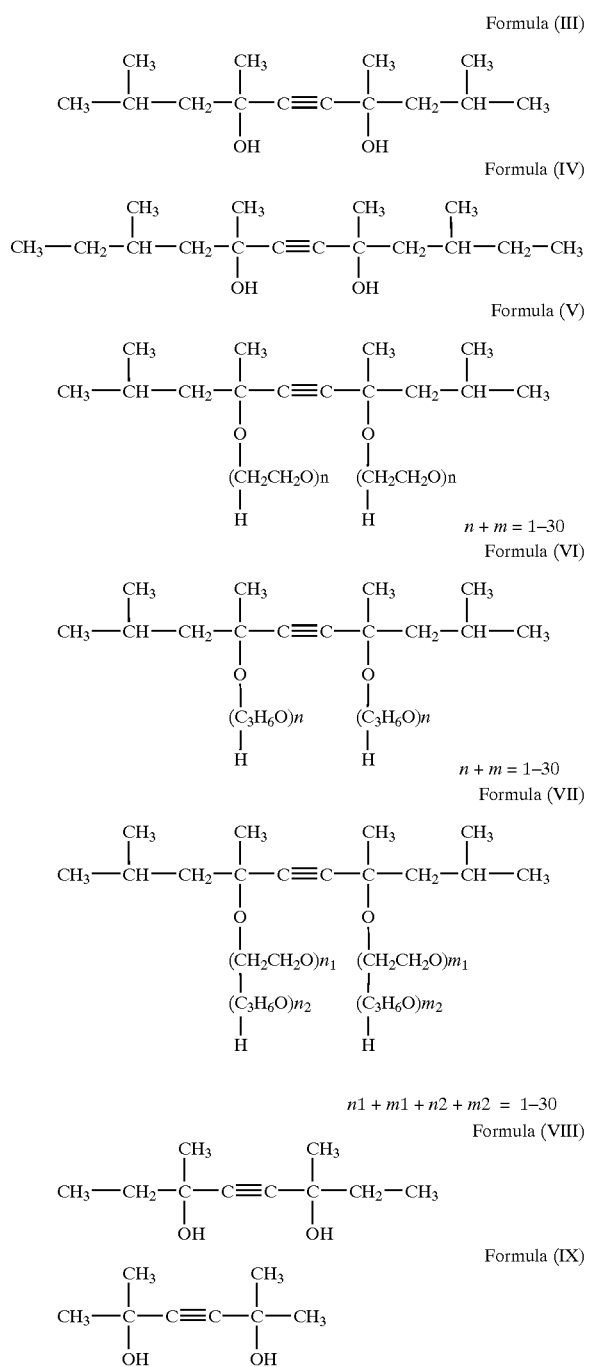

The substance expressed by formula (I) above preferably has a strongly lipophilic structure in order to be able to further enhance effects such as excellent penetrability into the recording medium, low foaming, and/or antifoaming properties as an additive to the inkjet ink. In this sense, the subscripts n and m, which indicate the repeating alkylene oxide units, are preferably low, with n=m=0 an even more preferred option. Among these, the 2,4,7,9-tetramethyl-5-decyne-4,7-diol expressed by formula (III) above is preferred if ease of handling and availability are also taken into account. The 2,4,7,9-tetramethyl-5-decyne-4,7-diol can be obtained, for example, as Surfynol 104 (registered trade name) from Air Products.

The substance expressed by formula (II) above, which itself functions as a nonionic surfactant, not only allows ink to rapidly penetrate into the recording medium, and printed matter to dry faster as a nonionic surfactant, but is also expected to act as a solubilizer of the substance expressed by formula (I) above in an aqueous medium. Using a combination of the substance expressed by formula (I) above and the substance expressed by formula (II) above makes it possible to prevent ejection defects and other problems while ensuring excellent penetrability. A distinctive feature of the substance expressed by formula (II) above is that the structure thereof comprises lipophilic units made up of alkyl or cycloalkyl groups with a carbon number of 4 to 20, and hydrophilic units that comprise repeating structures of ethylene oxide groups and repeating structures of propylene oxide groups in the order indicated. As a result of extensive research, the inventors discovered that because of its structure, the substance expressed by formula (II) above can endow an inkjet ink with excellent penetrability and ejection reliability. Although the reason that this structure is preferred is not yet clear, it is assumed that the repeating structures of propylene oxide groups bonded to the ends of molecules interact in a desirable way with the substance expressed by formula (I) above, and also with the coloring material in the ink and with the mildly lipophilic units of other additives, contributing to the stable state of the overall system in the ink.

According to an aspect of the present invention, the H.L.B. value of the substance expressed by formula (II) above is preferably within a range of 10 to 18. By keeping the H.L.B. value of the substance expressed by formula (II) above within the range of 10 to 18, it is possible to adequately balance the penetrability and the solubilizer action of the substance expressed by formula (II) above as such. The H.L.B. value is a index devised for assessing the balance between hydrophilic and lipophilic properties, and although there are various approaches, the value calculated using the following formula is used the most.

$H. L. B.$ value of nonionic surfactant=(Hydrophilic units in the molecule, wt %)/5

Specifically, the H.L.B. value can be arbitrarily set by adequately selecting the carbon number of $R_5$ in formula (II) above, or by adequately selecting the subscripts i and j, which are the repeating units of ethylene oxide and propylene oxide groups. A structure in which the linear alkyl group $R_5$ has a carbon number of 12 to 15, the i-value is within a range of 6 to 18, and the j-value is within a range of 1 to 5 can be cited as an example of a more preferred structure for the substance expressed by formula (II) above.

According to another aspect of the present invention, a product comprising a mixture of two or more types of compounds having different H.L.B. values is preferable as the compound expressed by formula (II) above. The H.L.B. value is useful for roughly describing the properties, uses, and actions of a surfactant. Using a mixture of two or more types of compounds having different H.L.B. values means providing a mechanism whereby separate roles are assigned to the actions of compounds that contribute to penetrability and compounds that provide a contribution by acting as solubilizers. The compound expressed by formula (II) above is thereby allowed to exhibit the desired functions in a more effective manner.

According to an aspect of the present invention, the W1/W2 value is preferably kept within a range of 0.001 to 10, where W1 is the weight ratio of the added compound expressed by formula (I) above in the ink composition, and W2 is the weight ratio of the added compound expressed by formula (II) above in the ink composition. If the W1/W2 value is less than 0.001, the penetrability of ink into the recording medium is sometimes inadequate. If the W1/W2 value is greater than 10, there is a risk that the compound expressed by formula (II) above will have insufficient action as a solubilizer in relation to the compound expressed by formula (I) above, and problems such as deposition of insolubles or unstable ejection will sometimes be encountered.

According to an aspect of the present invention, the weight ratio of the added compound expressed by formula (I) above in the ink composition is preferably 0.01 to 1.0 wt %. If the weight ratio of the added substance expressed by formula (I) above in the ink composition is less than 0.01, there is a risk that the ink will not be able to adequately penetrate the recording medium. Conversely, if the ratio is 1.0 or greater, there is a risk that it will be impossible to obtain adequate water solubility even by adding the compound expressed by formula (II) above, and problems such as deposition of insolubles or unstable ejection will sometimes be encountered.

According to an aspect of the present invention, one, two, or more types of water-soluble compounds selected from the group consisting of alkylene glycol monoalkyl ethers, 1,2-alkyl diols, and lactam compounds are preferably added as well. The water-soluble compounds selected from the above group have the effect of compensating for the penetrability of the compounds expressed by formulas (I) and (II), and are also expected to have the effect of causing the compounds expressed by formula (I) and (II) to be dissolved in an aqueous medium in a more stable manner. Specifically, diethylene glycol monobutyl ether and triethylene glycol monobutyl ether can be cited as examples of such alkylene glycol monoalkyl ethers; 1,2-propanediol, 1,2-hexanediol, and 1,2-octanediol can be cited as examples of such 1,2-alkyl diols; and 2-pyrrolidone and 2-methylpyrrolidone can be cited as examples of such lactam compounds. It is apparent, however, that these examples are nonlimiting and that other compounds may be used without departing from the aspects of the present invention. The amount in which the water-soluble compounds selected from the aforementioned group are added is not subject to any particular limitations and can be comprehensively evaluated and set based on the desired effect and on the viscosity, surface tension, pH, and other physical properties of the ink. The range 0 to 15 wt % is generally appropriate.

Substantially any coloring material (dye or pigment) described in the Color Index may be used as the coloring material contained in the inkjet ink of the present invention. There are also many materials that are not described in the Color Index but can nevertheless be used in an appropriate manner.

The dye that can be used as the aforementioned coloring material may be selected without any particular limitations from acid dyes, basic dyes, direct dyes, reactive dyes, and the like, specific examples of which include Acid Yellow 23 and 25; Direct Yellow 12, 26, 86, and 130; Basic Yellow 9 and 11; Acid Red 27, 28, 52, 254, and 289; Reactive Red 180; Direct Red 9, 13, 17, 23, and 227; Basic Red 3; Acid Blue 9 and 254; Basic Blue 9; Direct Blue 78, 86, and 199; Acid Black 52, 172, and 208; Food Black 2; Direct Black 19, 22, and 154; and Process Reactive Black 31.

Phthalocyanine, azo, anthraquinone, azomethine, fused-ring, and other pigments can be used in addition to, for example, carbon black and the Pigment Yellow, Pigment Red, Pigment Violet, Pigment Blue, Pigment Black, and other pigments described in the Color Index as the pigments that can be used for the aforementioned coloring material. It is also possible to use Yellow No. 4, No. 5, No. 205, and No. 401; Orange No. 228 and No. 405; Blue No. 1 and No. 404, and other organic pigments, as well as titanium oxide, zinc oxide, zirconium oxide, iron oxide, ultramarine blue, Prussian blue, chromium oxide, and other inorganic pigments.

When a pigment is used as the coloring material, the preferred practice is to use a dispersant together with the pigment because of considerations related to dispersion stability in the ink, or to use a surface-modified pigment as the pigment.

A surfactant, polymer material, or other additive commonly used to disperse a pigment in an aqueous medium can be used as the dispersant without any particular limitations. Specific examples include water-soluble surfactants such as higher fatty acid salts, higher alcohol sulfuric acid ester salts, and other anionic surfactants; aliphatic amine salts, phosphonium salts, and other cationic surfactants; and fatty acid esters of polyoxyethylene compounds and other such nonionic surfactants; as well as gelatin, casein, and other proteins; gum arabic and other natural rubbers; saponin and other glucoxides; methyl cellulose and other cellulose derivatives; ligninsulfonates, shellac, and other natural polymers; polyacrylates, styrene/acrylic acid copolymer salts, vinyl naphthalene-acrylic acid copolymer salts, styrene/maleic acid copolymer salts, vinyl naphthalene/maleic acid copolymer salts, β-naphthalenesulfonic acid/formalin condensate salts, polyphosphoric acids, and other anionic polymers; and polyvinyl alcohol, polyvinyl pyrrolidone, polyethylene glycol, and other nonionic polymers, which may be used singly or as a combination of two or more types.

The dispersant preferably has a number-average molecular weight of from 100 to 50,000, and more preferably from 200 to 40,000, from the standpoint of solubility in the inkjet ink. If the molecular weight is less than 100, printing nonuniformities sometimes occur, and if the molecular weight is greater than 50,000, situations are sometimes encountered in which the ink viscosity increases, discharge stability deteriorates, and other problems occur. The dispersant is contained in the ink of the present invention in an amount that is preferably 0.01 to 5 wt %, and more preferably 0.3 to 2 wt %. If the content is less than 0.01 wt %, the pigment sometimes has inadequate dispersion stability, and if the content is greater than 5 wt %, situations are sometimes encountered in which the ink viscosity increases, discharge stability deteriorates, and other problems occur.

The surface-modified pigment that can be used as the aforementioned coloring material is obtained by a process in which a large number of hydrophilic functional groups and/or salts thereof (referred to hereinbelow as "dispersibility-imparting groups") are bonded to the pigment surface either directly or indirectly via an alkyl group, alkyl ether group, aryl group, or the like, and is a pigment that can be dispersed and/or dissolved in an aqueous medium without a dispersant. As used herein, the phrase "dispersed and/or dissolved in an aqueous medium without a dispersant" refers to a state in which the pigment is stably present at the minimum dispersible particle diameter in an aqueous medium without the use of dispersants such as those described above. As used herein, the term "minimum dispersible particle diameter" refers to the particle diameter of a pigment that does not decrease any further with an increase in the dispersion time.

Because an ink that contains the aforementioned surface-modified pigment as the coloring material does not need to contain a dispersant such as those described above and added in order to disperse an ordinary pigment, it is easy to prepare an ink that has excellent ejection stability and is only slightly subject to the foaming normally caused by the dispersant-induced reduction in antifoaming properties. In addition, suppressing the dispersant-induced marked increase in viscosity makes it possible to further raise the pigment content, allows print density to be adequately increased, and otherwise facilitates handling.

Examples of the dispersibility-imparting groups bonded on the surface of the surface-modified pigment include carboxyl groups, carbonyl groups, hydroxyl groups, sulfone groups, phosphoric acid groups, quaternary ammonium, and salts thereof. Compounds identical to the pigments cited as the aforementioned coloring materials may also be used as pigments that constitute the starting materials for such surface-modified pigments.

The aforementioned surface-modified pigments may, for example, be produced by subjecting pigments to a physical or chemical treatment, whereby the aforementioned dispersibility-imparting groups or active species having the aforementioned dispersibility-imparting groups are bonded (grafted) to the pigment surface vacuum plasma treatment may be cited as an example of the aforementioned physical treatment. Examples of the aforementioned chemical treatment include wet oxidation techniques in which the pigment surface is oxidized with an oxidizer in water, and methods in which carboxyl groups are bonded via phenyl groups by bonding p-aminobenzoic acid to the pigment surface.

The pigments (including the aforementioned surface-treated pigments) preferably have a mean grain size of 1 to 300 nm, and more preferably 10 to 200 nm, because of considerations related to ink storage stability, nozzle plugging prevention, and the like. The content of such pigments in the ink of the present invention is preferably 0.5 to 30 wt %, and more preferably 1 to 10 wt %. If the content is less than 0.5 wt %, the print density is sometimes inadequate, and if the content is greater than 30 wt %, situations are sometimes encountered in which the ink viscosity increases, the nozzles become plugged, and other problems occur.

The water contained in the inkjet ink of the present invention is the principal solvent, and deionized water, ultrafiltration water, reverse osmosis water, distilled water, or another type of purified water or ultrapure water is preferably used. In particular, using water that has been sterilized by ultraviolet radiation, hydrogen peroxide addition, or the like is preferred from the standpoint of preventing the production of mold or bacteria and allowing the ink to be stored for a long time. The amount of water contained in the ink of the present invention is preferably 10 to 90 wt %, and more preferably 30 to 80 wt %.

Moisturizers, pH modifiers, fixing agents, antioxidants, UV absorbers, preservatives, fungicides, and the like may be added as needed to the inkjet ink of the present invention.

The moisturizers are expected to improve ejection stability, to prevent nozzle plugging, and the like. Organic solvents or water-soluble solids commonly used with water-base ink compositions may be employed as such moisturizers. Specific examples include ethylene glycol, diethylene glycol, triethylene glycol, tetraethylene glycol, dipropylene glycol, and other low-molecular-weight glycols; 1,3-propanediol, 1,4-butanediol, 1,5-pentanediol, 1,6-hexanediol, 1,2,6-hexanetriol, pentaerythritol, glycerol, and other polyols; ethanol, propanol, and other lower alcohols; urea, thiourea, ethylene urea, 1,3-dimethylimidazolidinone, and other ureas; and maltitol, sorbitol, gluconolactone, maltose, and other sugars.

Any compound conventionally used with water-base ink compositions in order to bring their pH to within a specific range may be employed as a pH modifier. Specifically, it is possible to use lithium hydroxide, potassium hydroxide, sodium hydroxide, and other alkali metal hydroxides; or ammonia, triethanolamine, triisopropanolamine, diethanolamine, and other amines. Any compound conventionally used with water-base ink compositions in order to keep their pH within a specific range may be employed as a pH buffer. Specifically, it is possible to use collidine, imidazole, phosphoric acid, 3-(N-morpholino)propanesulfonic acid, tris(hydroxymethyl)aminomethane, boric acid, and the like.

Water-soluble resins, aqueous emulsions, microparticulate aqueous polymers, and the like may be used as fixing agents. Examples of suitable water-soluble resins include water-soluble rosins, alginic acids, polyvinyl alcohol, hydroxypropyl cellulose, carboxymethyl cellulose, hydroxyethyl cellulose, methyl cellulose, styrene/acrylic acid resins, styrene/acrylic acid/acrylic acid ester resins, styrene/maleic acid resins, styrene/maleic acid half-ester resins, acrylic acid/acrylic acid ester resins, isobutylene/maleic acid resins, rosin-modified maleic acid resins, polyvinyl pyrrolidone, gum arabic starch, polyallylamine, polyvinylamine, and polyethyleneimine. Examples of suitable aqueous emulsions and microparticulate aqueous polymers include styrene/acrylic acid emulsions and acrylic acid emulsions.

The following compounds may be used as antioxidants or UV absorbers: allophanate, methyl allophanate, and other allophanates; biuret, dimethyl biuret, tetramethyl biuret, and other biurets; L-ascorbic acid and salts thereof; Tinuvin 328, 900, 1130, 384, 292, 123, 144, 622, 770, and 292; Irgacor 252 and 153; Irganox 1010, 1076, and 1035; and MD 1024 from Ciba-Geigy, and well as lanthamide oxides.

The preservatives and fungicides may be selected from among, for example, sodium benzoate, pentachlorophenol sodium, 2-pyridine thiol-1-oxide sodium, sodium sorbate, sodium dehydroacetate, and 1,2-dibenzisothiazolin-3-one (Proxel CRL, Proxel BDN, Proxel GXL, Proxel XL-2, and Proxel TN, manufactured by ICI).

The inkjet ink of the present invention can be prepared in the same manner as conventional ink by making use of a conventionally known apparatus such as a ball mill, sand mill, attritor, basket mill, or roll mill. Coarse particles are preferably removed during preparation in order to prevent nozzle plugging. The coarse particles are removed by a process in which, for example, an ink obtained by mixing the aforementioned components is filtered using a membrane filter, mesh filter, or other such filter to remove particles that are preferably 10 µm or greater, and more preferably 5 µm or greater.

(Inkjet Recording Method)

For the inkjet recording method of the present invention, it is possible to use any method as long as it involves a system in which ink is ejected from fine nozzles as droplets, and these droplets are deposited on a recording medium. Several such methods are described below. The first involves an electrostatic attraction system in which a strong electric field is applied between a nozzle and an accelerating electrode disposed in front of the nozzle, ink is continuously sprayed from the nozzle in the form of droplets, and a print information signal is applied to deflection electrodes while the ink drops travel through the space between the deflection electrodes to perform recording, or a system in which the ink drops are sprayed in accordance with print information signals without any deflection.

The second method involves a system in which pressure is applied to ink drops by a small pump, and the nozzle is mechanically vibrated with a crystal oscillator or the like to forcibly spray the ink drops. The sprayed ink drops are electrically charged concurrently with spraying, and a print information signal is applied to deflection electrodes while the ink drops travel through the space between the deflection electrodes to perform recording.

The third method involves a system featuring a piezoelement, in which pressure is applied by the piezoelement to the ink drops at the same time as a print information signal is provided, and the ink drops are sprayed and recorded.

The fourth method involves a system in which ink drops are rapidly expanded in volume by the action of thermal energy, heated and foamed by a very small electrode in accordance with a print information signal, and sprayed and recorded.

Any of these systems may be used in the inkjet recording method that features the ink of the present invention.

(Recorded Matter)

The recorded matter of the present invention is obtained by the above-described inkjet recording method through the use of at least the above-described water-base ink composition. This recorded matter has sharp edges due to the use of the ink of the present invention, exhibits reduced bleeding between adjacent colors when used in multicolor printing, and has excellent quality.

(Inkjet Recording Apparatus)

The inkjet recording apparatus of the present invention is an inkjet recording apparatus for ejecting ink droplets and depositing these droplets on a recording medium to perform recording, wherein at least an inkjet ink having the above-described composition is used as the ink. In the present invention, it is possible to use a recording apparatus based on any of the inkjet recording systems described above.

EXAMPLES

Example A

Specific examples and the like of the present invention will now be described, but the present invention is not limited by the examples or the like that follow.

The water-soluble coloring materials used in the present invention will be described with reference to the use of dyes, pigments, or both dyes and pigments.

(Production of Surface-Treated Pigment)

Water-soluble pigment 1 was manufactured in the following manner by a process in which carbon black was oxidized with hypochlorous acid to attach carboxylic groups to the surface of the carbon black. Monarch 880 (manufactured by Cabot), a carbon black, was wetted with water, an aqueous solution of sodium hypochlorite was added, the system was heated to 100° C., and a treatment was performed for 24 hours. The product was then repeatedly washed and centrifuged to remove the hypochlorite, chlorine, and coarse particles. The surface-treated pigment may also be acquired as a commercially available product if it is black in color. CAB-O-JET 300 from Cabot and CW1 from Orient Kagaku can be cited as examples of carbon blacks that can by dispersed in water by anionic groups without a dispersant. CAB-O-JET IJX55 from Cabot can be cited as an example of carbon black that can by dispersed in water by cationic groups without a dispersant.

Water-soluble pigment 2 was manufactured in the following manner by a process in which the material was oxidized with sulfamic acid to attach sodium sulfonate groups to the surface of carbon black. The material used was produced by a method identical to the one described in Japanese Patent Application Laid-open Nos. H8-283596, H10-110110, H10-110111, H10-110114, and elsewhere. The process was conducted by dispersing a carbon black pigment in sulfolane, making an addition to this dispersion, and heating the system to 120° C. The components were dispersed in advance by high-speed shear in a high-speed mixer or the like and made into a slurry-like dispersion. The dispersion was slowly agitated, a treatment agent that comprised sulfamic acid was added, and dispersion groups were introduced to the pigment surface. The system was then heated to 200° C., and the solvent and the remaining sulfolane were removed from the pigment slurry. The removal was accomplished by repeated washing and centrifugation.

(Production of Polymer Dispersion Pigment)

Five parts of Raven C (manufactured by Colombian Carbon), a carbon black pigment, and 3 parts of Adeka Reasoap SE-10N, which is a polymerizable surfactant manufactured by Asahi Denka, were added to 80 parts of deionized water; ultrasonic waves were applied for 4 hours; and a dispersion treatment was performed in a reaction container equipped with an ultrasonic generator, a stirrer, a dropping device, a cold water refluxing condenser, and a temperature regulator in accordance with the same method as in example 1 of Japanese Patent Application Laid-open No. H10-316909. Subsequently, 1.6 parts of acrylonitrile and 0.05 part of potassium persulfate were further added, and a polymerization reaction was performed for 48 hours at 60° C. The resulting solution was filtered using a 0.4-$\mu$m membrane filter to remove coarse particles.

Subsequently, 27 parts of deionized water and 0.05 part of sodium laurylsulfate were further added to the reaction container, 100 parts of deionized water and 0.5 part of potassium persulfate as a polymerization initiator were further introduced, and a 70° C. nitrogen atmosphere was maintained. Subsequently, 3 parts of Adeka Reasoap SE-10N was introduced and stirred; a mixed solution comprising 15 parts of styrene, 6 parts of tetrahydrofurfuryl methacrylate, 45 parts of butyl acrylate, and 0.02 part of t-dodecylmercaptan was added in drops and reacted; the product was neutralized with sodium hydroxide; the pH was adjusted to 8; and the product was filtered using a 0.3-$\mu$m filter, yielding polymer-dispersed, water-soluble pigment 3.

Dispersions of water-soluble pigments 4 to 6 were obtained by the same technique as above. Pigment Blue 15:3 (copper phthalocyanine pigment from Clariant) was used for the dispersion of pigment 4. Pigment Red 122 (dimethyl quinacridone pigment from Clariant) was used for the dispersion of pigment 5. Pigment Yellow 180 (diketopyrrolopyrrole from Clariant) was used for the dispersion of pigment 6.

In addition, encapsulated pigment microparticles such as those described in Japanese Patent Publication No. H7-94634 and Japanese Patent Application Laid-open Nos. H8-59715 and 2001-139849 may also be used when a pigment is employed.

(Production of Emulsion A)

A reaction container was equipped with a dropping device, a thermometer, a cold water reflux condenser, and a stirrer; 100 parts of deionized water were introduced; and 0.2 part of the polymerization initiator potassium persulfate was gradually added under stirring in a 70° C. nitrogen atmosphere. A monomer solution comprising 0.05 part of sodium laurylsulfate, 4 parts of glycidoxyacrylate, 5 parts of styrene, 6 parts of tetrahydrofurfuryl methacrylate, 5 parts of butyl acrylate, and 0.02 part of t-dodecylmercaptan was added in drops to 7 parts of deionized water at 70° C. and reacted, yielding a primary substance. 2 parts of a 10% solution of ammonium persulfate were added to the primary substance and stirred; a reaction solution comprising 30 parts of deionized water, 0.2 part of potassium laurylsulfate, 30 parts of styrene, 15 parts of butyl methacrylate, 16 parts of butyl acrylate, 2 parts of acrylic acid, 1 part of 1,6-hexanediol dimethacrylate, and 0.5 part of t-dodecylmercaptan was further added under agitation at 70° C.; a polymerization reaction was performed; the product was neutralized with ammonia; the pH was brought to 8 to 8.5; and the product was filtered using a 0.3-μm filter. The resulting aqueous solution of polymer microparticles was designated emulsion A.

(Ink Preparation Example)

The numbers in parentheses show grain sizes measured using Microtrack UPA (Nikkiso Co., Ltd.). Water-soluble dye 1 is Direct Yellow 132, water-soluble dye 2 is Acid Blue 9 Proxel XL-2 was added in an amount of 0.1 to 1 wt % to water, which constituted the balance in the example, in order to prevent ink corrosion; and benzotriazole was added thereto in an amount of 0.001 to 0.05 wt % in order to prevent the inkjet head member from corrosion.

Example A1

| | Amount added (wt %) |
|---|---|
| Water-soluble pigment 1 (105) | 5.0 |
| Formula (IA) substance (1) | 1.0 |
| Formula (IIA) substance (1) | 0.3 |
| Emulsion A | 3.0 |
| DEGmBE | 7.0 |
| Glycerol | 20.0 |
| 1,5-Pentanediol | 2.0 |
| Triethanolamine | 0.8 |
| Water | Balance |

In the formula (IA) substance (1), $R_1$ and $R_2$ are methyl groups; $R_3$ and $R_4$ are isobutyl groups; and A and B are propylene oxide and ethylene oxide, wherein the propylene oxide groups have 4 units as an average value, and the average value of the ethylene oxide groups is 6 units. The total of j and k is 10 as an average value. Emalex DAPE-0207 from Nihon Emulsion was used as the formula (IIA) substance (1).

Example A2

| | |
|---|---|
| Water-soluble pigment 2 (85) | 3.0 |
| Formula (IA) substance (2) | 1.2 |
| Formula (IIA) substance (2) | 1.0 |
| Emulsion A | 1.0 |
| DEGmBE | 10.0 |
| Glycerol | 9.0 |
| Dipropylene glycol | 5.0 |
| Triethanolamine | 1.0 |
| Potassium hydroxide | 0.1 |
| Water | Balance |

In the formula (IA) substance (2), $R_1$ and $R_2$ are methyl groups; $R_3$ and $R_4$ are isobutyl groups; and A and B are both zero. Emalex DAPE-02012 from Nihon Emulsion was used as the formula (IIA) substance (2).

Example A3

| | |
|---|---|
| Water-soluble pigment 3 (90) | 5.5 |
| Formula (IA) substance (3) | 1.4 |
| Formula (IIA) substance (3) | 1.0 |
| 1,2-Hexanediol | 3.0 |
| TEGmBE | 1.0 |
| Glycerol | 17.0 |
| 2-Pyrrolidone | 2.0 |
| Triethylene glycol | 3.0 |
| Triethanolamine | 0.6 |
| Water | Balance |

In the formula (IA) substance (3), $R_1$ and $R_2$ are ethyl groups; $R_3$ and $R_4$ are methyl groups; and A and B are propylene oxide and ethylene oxide, wherein the propylene oxide groups have 4 units as an average value, and the average value of the ethylene oxide groups is 10 units. The total of j and k is 14 as an average value. Emalex DAPE-0203 from Nihon Emulsion was used as the formula (IIA) substance (3).

Example A4

| | |
|---|---|
| Water-soluble pigment 4 (80) | 5.0 |
| Formula (IA) substance (4) | 0.8 |
| Formula (IIA) substance (4) | 1.0 |
| 1,2-Hexanediol | 3.0 |
| 1,2-Pentanediol | 3.0 |
| 1,6-Hexanediol | 5.0 |
| Glycerol | 15.0 |
| Tripropylene glycol | 1.0 |
| DMI | 2.0 |
| Triethanolamine | 0.6 |
| Sodium benzoate | 0.1 |
| Water | Balance |

Surfynol 104 from Air Products (USA) was used as formula (IA) substance (4). Emalex DAPE-0220 from Nihon Emulsion was used as formula (IIA) substance (4).

Example A5

| | |
|---|---|
| Water-soluble pigment 1 | 3.0 |
| Formula (IA) substance (5) | 0.2 |
| Formula (IIA) substance (5) | 0.2 |
| TEGmBE | 5.0 |
| PGmBE | 2.0 |
| Glycerol | 10.5 |
| 1,5-Pentanediol | 3.0 |
| Triethanolamine | 0.9 |
| Water | Balance |

Acetylenol EL from Kawaken Chemicals was used as the formula (IA) substance (5). Emalex 707 from Nihon Emulsion was used as the formula (IIA) substance (5).

Example A6

| | |
|---|---|
| Water-soluble pigment 1 | 5.0 |
| Formula (IA) substance (6) | 0.5 |
| Formula (IIA) substance (6) | 0.4 |
| DPGmBE | 2.0 |

-continued

| | |
|---|---|
| DEGmBE | 10.0 |
| Glycerol | 10.0 |
| Neopentyl glycol | 5.0 |
| Triethanolamine | 0.6 |
| Water | Balance |

In the formula (IA) substance (6), $R_1$ and $R_2$ are methyl groups; $R_3$ and $R_4$ are n-propyl groups; and A and B are propylene oxide and ethylene oxide, wherein the propylene oxide groups have 2 units as an average value, and the average value of the ethylene oxide groups is 4 units. The total of j and k is 6 as an average value. In water-soluble dye 2, m is 1, n is 1, and M is potassium. Emalex 712 from Nihon Emulsion was used as the formula (IIA) substance (6).

Example A7

| | |
|---|---|
| Water-soluble pigment 2 | 5.0 |
| Formula (IA) substance (7) | 1.0 |
| Formula (IIA) substance (7) | 1.0 |
| TEGmBE | 10.0 |
| Glycerol | 10.0 |
| Trimethylol propane | 5.0 |
| Triethanolamine | 0.1 |
| Water | Balance |

In the formula (IA) substance (7), $R_1$ and $R_2$ are methyl groups; $R_3$ and $R_4$ are isobutyl groups; and A and B are propylene oxide and ethylene oxide, wherein the propylene oxide groups have 10 units as an average value, and the average value of the ethylene oxide groups is 10 units. The total of j and k is 50 as an average value. A 1:1 mixture of Emalex DAPE-0207 and Emalex DAPE-0230 from Nihon Emulsion was used as the formula (IIA) substance (7).

Example A8

| | |
|---|---|
| Water-soluble pigment 1 | 5.5 |
| Water-soluble dye 1 | 0.5 |
| Formula (IA) substance (8) | 1.0 |
| Formula (IIA) substance (8) | 1.0 |
| DPGmBE | 2.0 |
| DEGmBE | 5.0 |
| Glycerol | 10.0 |
| Triethylene glycol | 5.0 |
| Triisopropanolamine | 0.6 |
| 2-Pyrrolidone | 3.2 |
| Water | Balance |

In the formula (IA) substance (8), $R_1$ and $R_2$ are methyl groups; $R_3$ and $R_4$ are isobutyl groups; and A and B are propylene oxide and ethylene oxide, wherein the propylene oxide groups have 1 unit as an average value, and the average value of the ethylene oxide groups is 1 unit. The total of j and k is 2 as an average value. A 1:1 mixture of Emalex DAPE-0207 and Emalex 730 from Nihon Emulsion was used as the formula (IIA) substance (8).

The ink compositions used in comparative examples are shown below. Carbon black that was dispersed using a styrene acrylic acid dispersant of a random copolymer type was used for the pigments described in comparative examples. The mean grain sizes are shown in parentheses.

| Comparative Example A1 | |
|---|---|
| Water-soluble pigment 9 (90) | 5.0 |
| Dispersant | 3.0 |
| Nonionic surfactant | 0.8 |
| 2-Pyrrolidone | 3.0 |
| Polyethylene glycol 1000 | 4.0 |
| Deionized water | Balance |
| Comparative Example A2 | |
| Water-soluble dye (Food Black 2) | 5.5 |
| Glycerol | 10.0 |
| Ethyl carbitol | 10.0 |
| 2-Pyrrolidone | 5.0 |
| Deionized water | Balance |
| Comparative Example A3 | |
| Water-soluble pigment 11 (110) | 5.5 |
| Water-soluble dye (Food Black 2) | 2.5 |
| Diethylene glycol | 10.0 |
| Nonionic surfactant | 1.0 |
| Deionized water | Balance |

(Evaluation of Print Quality)

(Evaluation of Print Quality)

Results obtained by printing characters and evaluating their bleeding are shown in Table A as print evaluation results. In Table A, "A" indicates excellent, "B" fair, "C" poor, and "D" unacceptable.

TABLE A

Print Quality Evaluation Results

| | Examples | | | | | | | | Comparative Examples | | |
|---|---|---|---|---|---|---|---|---|---|---|---|
| | A1 | A2 | A3 | A4 | A5 | A6 | A7 | A8 | A1 | A2 | A3 |
| Conqueror | A | A | A | A | A | A | A | A | C | C | C |
| Favorit | A | A | A | A | A | A | A | A | D | D | D |
| Modo Copy | A | A | A | A | A | A | A | A | C | D | D |
| Rapid Copy | A | A | A | A | A | A | A | A | C | D | D |
| EPSON EPP | A | A | A | A | A | A | A | A | C | C | D |
| Xerox P | A | A | A | A | A | A | A | A | C | D | D |
| Xerox 4024 | A | A | A | A | A | A | A | A | C | D | D |
| Xerox 10 | A | A | A | A | A | A | A | A | B | D | D |
| Neenha Bond | A | A | A | A | A | A | A | A | D | D | D |
| Ricopy 6200 | A | A | A | A | A | A | A | A | B | C | D |
| Yamayuri | A | A | A | A | A | A | A | A | D | D | D |
| Xerox R | A | A | A | A | A | A | A | A | C | D | D |

Based on the results in Table A, inks such as those used in the comparative examples can be seen producing poor print quality, whereas good print quality can be obtained with the inks used in the present invention for inkjet recording.

The print evaluation was carried out using an inkjet printer PM-900C manufactured by Seiko Epson. Conqueror, Favorit, Modo Copy, Rapid Copy, EPSON EPP, Xerox 4024, Xerox 10, Neenha Bond, Ricopy 6200, Yamayuri, and Xerox R, which are the types of plain paper commercially available in Europe, US, and Japan, were used in the evaluation.

In the above examples, "DEGmBE" refers to diethylene glycol mono-n-butyl ether, "DMI" to 1,3-dimethyl-2-imidazolidinone, "PGmBE" to propylene glycol mono-n-butyl ether, "MPD" to 2-methyl-2,4-pentanediol, and "TEGmBE" to triethylene glycol mono-n-butyl ether.

In the examples, the absence of formula (IA) substance leads to the degradation of print quality and lowers the quality from A to B or less in Table A. Another feature of these examples is that if no formula (IA) substance is added, the amount added is limited and print quality degrades in the same manner because the formula (IA) substance has low solubility. It can thus be shown in relation to the present invention that good print quality can be obtained only by the concurrent use of the formula (IA) substance and formula (IIA) substance.

Example B

<Ink Preparation>

Inks of examples 1 to 11 and comparative examples 1 to 3 were prepared. The preparation was accomplished by mixing the components shown in Tables 1 to, 4 below at 25° C., stirring the mixture for 2 hours, and pressure-filtering the mixture through a membrane filter with a diameter of 5 μm at a pressure of 2 kg/cm². All the additions in Tables 1 to 4 are indicated in units of wt %, and the "balance" of deionized water designates adding the water during preparation to bring the total to 100 wt %. In addition, "dye 1" in Tables 1 to 4 is C.I. Direct Black 32, for which Direct Dust Black AB (registered trade name of a product manufactured by Sumitomo Chemical) was used. "Dye 2" in Tables 1 to 4 is C.I. Direct Blue 82, for which Karayasu Turquoise Blue GL (registered trade name of a product manufactured by Nippon Kayaku) was used. "Pigment 1" in Tables 1 to 4 is a surface-modified pigment that was obtained by oxidizing the surface of carbon black and for which CW1 (registered trade name of a product manufactured by orient Kagaku) was used. "Pigment 2" in Tables 1 to 4 is carbon black that was dispersed with the aid of a disperse resin and for which No. 0542 (registered trade name of a product manufactured by Mikuni Color) was used. The amounts added of "dye 1," "dye 2," pigment 1," and "pigment 2" in Tables 1 to 4 indicate the solids additions of the corresponding coloring materials.

TABLE 1

|  |  | Examples | | | |
|---|---|---|---|---|---|
|  |  | 1 | 2 | 3 | 4 |
| Coloring material | Compound | Dye 1 | Dye 2 | Pigment 1 | Pigment 2 |
|  | Amount added | 5% | 5% | 5% | 5% |
| Formula (I) compound | Compound | Formula (V) compound | Formla (IV) compound | Formula (III) compound | Formula (VI) compound |
|  | Amount added | 1% | 0.01% | 0.04% | 0.5% |
| Formula (II) compound | R5 | C12–C15 | C12–C13 | C12–C15 | C12–C13 |
|  | i | 16 | 8.5 | 12 | 12 |
|  | j | 2 | 2 | 2 | 4 |
|  | H.L.B. | 15.2 | 12.6 | 14.1 | 14.4 |
|  | Amount added | 1% | 5% | 0.05% | 0.4% |
| Solvent | Glycerol | — | — | 5% | 5% |
|  | Triethylene glycol | 5% | — | 5% | — |
|  | Dipropylene glycol | — | — | — | 5% |
|  | 1,5-Pentanediol | — | 5% | — | — |
|  | Triethanolamine | 1% | — | — | 1% |
|  | Tripropanolamine | — | 1.5% | 1% | — |
| Deionized water |  | Balance | Balance | Balance | Balance |

TABLE 2

|  |  | Examples | | | | | |
|---|---|---|---|---|---|---|---|
|  |  | 5 | 6 | 7 | | 8 | |
| Coloring material | Compound | Dye 1 | Pigment 1 | Dye 1 | | Pigment 1 | |
|  | Amount added | 5% | 5% | 5% | | 5% | |
| Formula (I) compound | Compound | Formula (V) compound | Formula (III) compound | Formula (V) compound | | Formula (III) compound | |
|  | Amount added | 1% | 0.04% | 1% | | 0.04% | |
| Formula (II) compound | R5 | C5–C7 | C12–C15 | C12–C15 | C12–C13 | C12–C15 | C12–C13 |
|  | i | 16 | 5 | 16 | 8.5 | 16 | 8.5 |
|  | j | 2 | 1 | 2 | 2 | 2 | 2 |
|  | H.L.B. | 18.1 | 9.3 | 15.2 | 12.6 | 15.2 | 12.6 |
|  | Amount added | 1% | 0.05% | 0.5% | 0.5% | 0.03% | 0.02% |
| Solvent | Glycerol | — | 5% | — | | 5% | |
|  | Triethylene glycol | 5% | 5% | 5% | | 5% | |
|  | Triethanolamaine | 1% | — | 1% | | — | |
|  | Tripropanolamine | — | 1% | — | | 1% | |
| Deionized water |  | Balance | Balance | Balance | | Balance | |

TABLE 3

|  |  | Examples | | |
|---|---|---|---|---|
|  |  | 9 | 10 | 11 |
| Coloring material | Compound | Dye 1 | Pigment 1 | Dye 2 |
|  | Amount added | 5% | 5% | 5% |
| Formula (I) compound | Compound | Formula (V) compound | Formula (III) compound | Formula (IV) compound |
|  | Amount added | 1% | 0.04% | 0.01% |
| Formula (II) compound | R5 | C12–C15 | C12–C15 | C12–C13 |
|  | i | 16 | 12 | 8.5 |
|  | j | 2 | 2 | 2 |
|  | H.L.B. | 15.2 | 14.1 | 12.6 |
|  | Amount added | 1% | 0.05% | 5% |
| Solvent | Glycerol | — | 5% | — |
|  | Triethylene glycol | 5% | 5% | — |
|  | 1,5-Pentanediol | — | — | 5% |
|  | Triethanolamine | 1% | — | — |
|  | Tripropanolamine | — | 1% | 1.5% |
|  | Triethylene glycol monobutyl ether | 5% | — | — |
|  | 1,2-Hexanediol | — | 3% | — |
|  | 2-Pyrrolidinone | — | — | 3% |
| Deionized water |  | Balance | Balance | Balance |

TABLE 4

|  |  | Comparative examples | | |
|---|---|---|---|---|
|  |  | 1 | 2 | 3 |
| Coloring material | Compound | Dye 2 | Pigment 1 | Dye 1 |
|  | Amount added | 5% | 5% | 5% |
| Formula (I) compound | Compound | Formula (IV) compound | Formula (III) compound |  |
|  | Amount added | 0.01% | 0.04% |  |
| Formula (II) compound | R5 |  |  | C12–C15 |
|  | i |  |  | 16 |
|  | j |  |  | 2 |
|  | H.L.B. |  |  | 15.2 |
|  | Amount added |  |  | 1% |
| Solvent | Glycerol | — | 5% | — |
|  | Triethylene glycol | — | 5% | 5% |
|  | 1,5-Pentanediol | 5% | — | — |
|  | Triethanolamine | — | — | 1% |
|  | Tripropanolamine | 1.5% | 1% | — |
| Deionized water |  | Balance | Balance | Balance |

<Evaluation of Print Quality>

The inks of examples 1 to 11 and comparative examples 1 to 3 were used to perform printing and to obtain recorded matter with the aid of EM-900C (registered trade name of a product manufactured by Seiko Epson), a piezoelectric on-demand inkjet recording device. Four types of paper were used for the recording medium: Xerox P and Xerox 4024 (registered trade names of products manufactured by Fuji Xerox) as medium-grade plain paper, EPP (registered trade name of a product manufactured by Seiko-Epson) as acid plain paper, and Xerox R (registered trade name of a product manufactured by Fuji Xerox) as recycled paper. The recorded matter was dried, then visually observed, and graded in the following manner with respect to its print quality.

Grade A—Minimal bleeding or feathering in the edge portions, and high sharpness on all types of paper.

Grade B—Minimal bleeding or feathering in the edge portions, and high sharpness on three or more types of paper.

Grade C—Some bleeding or feathering in the edge portions on three or more types of paper.

Grade D—Pronounced bleeding or feathering in the edge portions of some types of paper.

The evaluation results are summarized in Table 5.

TABLE 5

|  | Evaluation of print quality, grade | Evaluation of ejection stability, grade |
|---|---|---|
| Example 1 | B | B |
| 2 | A | B |
| 3 | A | B |
| 4 | B | A |

TABLE 5-continued

| | Evaluation of print quality, grade | Evaluation of ejection stability, grade |
|---|---|---|
| 5 | C | A |
| 6 | A | C |
| 7 | A | A |
| 8 | A | A |
| 9 | A | A |
| 10 | A | A |
| 11 | A | A |
| Comparative example 1 | A | D |
| 2 | A | D |
| 3 | D | A |

It is apparent from Table 5 that the print quality was assigned grades A to C and that excellent printing results were obtained using the inks of examples 1 to 11, which were inkjet inks comprising at least a coloring material and water, and which also comprised a compound expressed by formula (I) above and a compound expressed by formula (II) above. In particular, especially desirable print quality was obtained using the inks of examples 2, 3, 6, 8, 10, and 11, in which a value of zero was selected for n and m as the alkylene oxide repeating units in formula (I) above. Among these inks, the easiest to handle were the inks of examples 3, 6, 8, and 10, which were obtained using 2,4,7,9-tetramethyl-5-decyne-4,7-diol as the compound expressed by formula (I) above. In addition, the ink of example 5 received a C-grade ranking and had a slightly lower print quality than did the inks of other examples, which was attributed to the use of a compound with an H.L.B. value greater than 18 as the compound expressed by formula (II) above, prompting a conclusion that keeping the H.L.B. value of the compound expressed by formula (II) at 18 or less is more preferable from the standpoint of print quality. By contrast, D-grade print quality was obtained using the ink of comparative example 3, which contained the compound expressed by formula (II) but was devoid of the compound expressed by formula (I).

<Evaluation of Ejection Stability>

The inks of examples 1 to 11 and comparative examples 1 to 3 were loaded into the aforementioned EM-900C, a piezoelectric on-demand inkjet recording device; and ejection stability was evaluated by the following method. Specifically, ten-point characters and arbitrary fine line patterns were first printed using the EM-900C. A period was established immediately thereafter during which no printing was performed for a given time while a state was maintained in which the head portion was kept at a distance from the cap portion. The ten-point characters and arbitrary fine line patterns were printed and ejection stability was evaluated immediately after the passage of the given non-print period. The evaluation was performed in a 50° C. environment. The evaluation was performed to determine whether the components were stable in the ink specifically, it was concluded that an ink composition had high ejection stability if the ink could be stably ejected even after the given non-print period had lasted for a long time. Evaluations were conducted by varying the aforementioned non-print period, and the longest non-print period during which stable ejection was still possible was established for each ink. The resulting longest non-print periods were graded according to the following criteria.

Grade A—The longest non-print period is 30 seconds or greater.

Grade B—The longest non-print period is 20 seconds or greater but less than 30 seconds.

Grade C—The longest non-print period is 10 seconds or greater but less than 20 seconds.

Grade D—The longest non-print period is less than 10 seconds.

The results are summarized in Table 5. It is apparent from Table 5 that the ejection stability was assigned grades A to C and that adequate ejection characteristics were obtained using the inks of examples 1 to 11, which were inkjet inks comprising at least a coloring material and water, and which also comprised a compound expressed by formula (I) above and a compound expressed by formula (II) above. In particular, especially desirable ejection stability was obtained using the inks of examples 7 and 8, in which two or more types of compounds with various H.L.B. values were used for the compound expressed by formula (II) above; the ink of example 9, which further comprised an alkylene glycol monoalkyl ether; the ink of example 10, which further comprised a 1,2-alkyl diol, and the ink of example 11, which further comprised a lactam compound. These inks also provided adequate results in terms of the aforementioned print quality, and represented well-balanced inks. By contrast, D-grade ejection stability was obtained using the inks of comparative examples 2 and 3, which contained a compound expressed by formula (I) but was devoid of a compound expressed by formula (II).

The present invention is not to be construed as being limited by these examples, and various modifications can be made without departing from the essence of the present invention.

As described above, the present invention has the effect of providing an ink for inkjet recording that allows substantially bleed-free printing to be performed on the heretofore inadequate plain paper, and particularly recycled paper. In addition, the inkjet ink of the present invention has the effect of ensuring high print quality and maintaining high ejection stability on plain paper, recycled paper, and coated paper.

What is claimed is:

1. An inkjet ink, comprising a coloring material, a water-soluble organic solvent, water, a first nonionic substance that has acetylene bonds in the molecules thereof and that also has hydroxyl groups and/or alkylene oxide repeating structures, and a second nonionic substance that has lipohilic units comprising alkyl groups or cycloalkyl groups and that also has alkylene oxide repeating structures; wherein the first and second nonionic substances comprise a substance whose structure is shown by formula (IA) below, and a substance whose structure is shown by formula (IIA) below

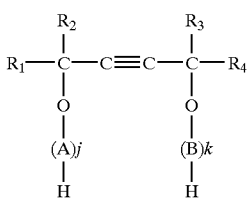

Formula (IA)

where $R_1$, $R_2$, $R_3$, and $R_4$ are each independently a methyl ethyl, propyl, or butyl group; A and B are each independently an ethylene oxide group, a propylene oxide group, or an ethylene oxide group and a propylene oxide group; and j+k (average value)≦50

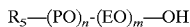

Formula (IIA)

where $R_5$ is an alkyl or cycloalkyl group with a carbon number of 4 to 20; PO is a propylene oxide group; EO is an ethylene oxide group; n and m are repeating units in a molecule; 0.5≦n≦5; 3≦m≦30; and EO and PO can have any sequence, and wherein the substance whose structure is shown by formula (IIA) is added in an amount of 0.1 to 10 times the amount of the substance whose structure is shown by formula (IA).

2. The ink according to claim 1, wherein the substance shown by formula (IA) is added in an amount of 0.1 wt % or greater and 10 wt % or less.

3. The ink according to claim 1, wherein the coloring material is one or more materials selected from the group consisting of water-soluble dyes, water-soluble pigments that are rendered dispersible in water by being subjected to a surface treatment, and water-soluble pigments that are rendered dispersible in water by means of a dispersion polymer.

4. The ink according to claim 1, wherein at least an alkylene glycol monoalkyl ether and/or 1,2-alkylene glycol is added to the ink.

5. The ink according to claim 4, wherein the alkylene glycol monoalkyl ether has no more than 10 repeating units of an alkylene glycol, and has a carbon number of 4 to 10 of an alkyl ether.

6. The ink according to claim 5, wherein the alkylene glycol monoalkyl ether is a di(tri)ethylene glycol monobutyl ether and/or (di)propylene glycol monobutyl ether.

7. The ink according to claim 4, wherein the 1,2-alkylene glycol is 1,2-hexanediol and/or 1,2-pentanediol.

8. The ink according to claim 4, wherein a substance comprising one or more compounds selected from the di(tri)ethylene glycol monobutyl ether, (di)propylene glycol monobutyl ether, and 1,2-alkylene glycols is added in an amount of 0.5 wt % or greater and 30 wt % or less.

9. The ink according to claim 4, wherein at least the substance shown by formula (IA) and one or more compounds selected from di(tri)ethylene glycol monobutyl ether, (di)propylene glycol monobutyl ether, and a 1,2-alkylene glycol are concurrently added.

10. The ink according to claim 9, wherein the content of the substance shown by formula (IA) is 0.1 wt % to 0.5 wt %, and the one or more compounds selected from di(tri)ethylene glycol monobutyl ether, (di)propylene glycol monobutyl ether, and 1,2-alkylene glycols are added in an amount of 1 wt % or greater.

11. The ink according to claim 3, wherein the dispersion polymer is one or more compounds selected from the group consisting of polyacrylic esters, styrene/acrylic acid copolymers, polystyrene, polyester, polyamide, polyimide, silicon-containing polymers, and sulfur-containing polymers.

12. The ink according to claim 4, wherein the 1,2-alkylene glycol is added in an amount of 15 wt % or less.

13. The ink according to claim 4, wherein the substance shown by formula (IA) is added in an amount of 0.5 wt % or greater, and the ratio thereof in relation to the 1,2-alkylene glycol is 1:0 to 1:10.

14. The ink according to claim 6, comprising no more than 10 wt % of (di)propylene glycol monobutyl ether.

15. The ink according to claim 6, wherein the substance shown by formula (IA) is added in an amount of 0.5 wt % or greater, and the ratio thereof in relation to the (di)propylene glycol monobutyl ether is 1:0 to 1:10.

16. The ink according to claim 6, comprising no more than 20 wt % of di(tri)ethylene glycol monobutyl ether.

17. The ink according to claim 6, wherein the substance shown by formula (IA) is added in an amount of 0.5 wt % or greater, and the ratio thereof in relation to the di(tri)ethylene glycol monobutyl ether is 1:0 to 1:10.

18. An inkjet ink, comprising at least a coloring material, water, a first nonionic substance that has acetylene bonds in the molecules thereof and that also has hydroxyl groups and/or alkylene oxide repeating structures, and a second nonionic substance that has lipophilic units comprsing alkyl groups or cycloalkyl groups and that also has alkylene oxide repeating structures, wherein said first and second nonionic substances comprise a substance whose structure is shown by formula (I) below, and a substance whose structure is shown by formula (II) below

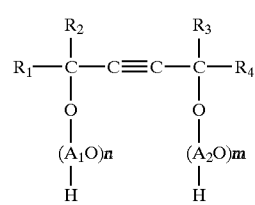

Formula (I)

where $R_1$, $R_2$, $R_3$, and $R_4$ are each independently an alkyl chain that has a carbon number of 1 to 6 and may have a branched structure; $A_1O$ and $A_2O$ are each independently a copolymer structure of an ethylene oxide group, a propylene oxide group, or an ethylene oxide group and a propylene oxide group; the subscripts n and m indicate the repeating $A_1O$ and $A_2O$ units; 0≦n<30, 0≦m<30, and 0≦n+m<50;

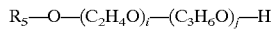

Formula (II)

where $R_5$ is an alkyl or cycloalkyl group with a carbon number of 4 to 20, and the subscripts i and j indicate the repeating $C_2H_4O$ units and $C_3H_6O$ units, respectively, with i and j being selected to impart to the second substance an HLB value that allows the ink to form print on a plurality of types of recording paper without exhibiting pronounced bleeding or feathering in edge portions of the print, wherein a value W1/W2 is within a range of 0.001 to 10, where W1 is the weight ratio of the substance expressed by formula (I) in the ink, and W2 is the weight ratio of the substance expressed by formula (II) in the ink.

19. The ink according to claim 18, wherein the subscripts that indicate the repeating alkylene oxide units in formula (I) are n=m=0.

20. The ink according to claim 18, wherein the compound expressed by formula (I) is 2,4,7,9-tetramethyl-5-decyne-4,7-diol.

21. The ink according to claim 18, wherein the H.L.B. value of the substance expressed by formula (II) falls within a range of 10 to 18.

22. The ink according to claim 18, wherein $R_5$ is a linear alkyl group with a carbon number of 12 to 15, the i-value is within a range of 6 to 18, and the j-value is within a range of 1 to 5 in the substance expressed by formula (II).

23. The ink according to claim 18, comprising a mixture of two or more types of compounds having different H.L.B. values as the substance expressed by formula (II).

24. The ink according to claim 18, wherein the weight ratio of the added substance expressed by formula (I) in the ink composition is 0.01 to 1.0 wt %.

25. The ink according to claim 1, further comprising one or more types of water-soluble compounds selected from the group consisting of alkylene glycol monoalkyl ethers, 1,2-alkyl diols, and lactam compounds.

26. An inkjet recording method, comprising ejecting droplets of the ink according to claim 1 and depositing these droplets on a recording medium.

27. A recorded matter, obtained by performing the recording method according to claim 26.

28. An inkjet recording apparatus, loaded with the ink according to claim 1.

29. The ink according to claim 18, wherein the subscript i is 6 to 18 and the subscript j is 1 to 5.

30. An inkjet recording method, comprising ejecting droplets of the ink according to claim 18 and depositing the ejected droplets on a recording medium.

31. The recording medium produced by the inkjet recording method of claim 30.

* * * * *